United States Patent [19]

Huschka et al.

[11] 4,092,218
[45] May 30, 1978

[54] FUEL ELEMENT FOR HIGH TEMPERATURE REACTORS

[75] Inventors: Hans Huschka, Grossauehim; Franz Josef Herrmann, Rodenbach, both of Germany

[73] Assignee: Nukem GmbH, Hanau, Germany

[21] Appl. No.: 501,449

[22] Filed: Aug. 28, 1974

Related U.S. Application Data

[63] Continuation of Ser. No. 301,725, Oct. 30, 1972, abandoned.

[30] Foreign Application Priority Data

Feb. 25, 1972 Germany .............................. 2208855

[51] Int. Cl.$^2$ ................................................. G21C 5/00
[52] U.S. Cl. ................................................ 176/84; 264/.5
[58] Field of Search ................... 176/69, 71, 84; 264/.5

[56] References Cited

U.S. PATENT DOCUMENTS

| | | | |
|---|---|---|---|
| 3,158,547 | 11/1964 | Smith | 176/69 |
| 3,224,944 | 12/1965 | Turner et al. | 176/69 |
| 3,274,068 | 9/1966 | Koutz et al. | 176/69 |
| 3,439,073 | 4/1969 | Howard et al. | 176/69 X |
| 3,668,283 | 6/1972 | Moreau | 176/71 X |

Primary Examiner—Peter A. Nelson
Attorney, Agent, or Firm—Cushman, Darby & Cushman

[57] ABSTRACT

A fuel element for high temperature reactors with good heat transfer from the fuel charge to the structural graphite is obtained by seating the fuel charges without a gap in the bores of the structural graphite.

31 Claims, 2 Drawing Figures

FUEL ELEMENT FOR HIGH TEMPERATURE REACTORS

This is a continuation, of application Ser. No. 301,725 filed Oct. 30, 1972, now abandoned.

In the case of high temperature reactors, particularly the block-shaped fuel elements among the various fuel element types as used for example in the gas cooled Fort St. Vrain Reactor (Nuclear Engineering International 1969, pp. 1073–1777) have gained both interest and importance. These fuel elements, which also are described in U.S. Pat. No. 3,413,196, are hexagonal blocks of graphite in which bores for the fuel and cooling gas are drilled parallel to the axis of the prism in a hexagonal distribution. The fuel is bound in the form of coated particles with graphite matrix into cylindrically shaped bodies that are inserted into the above mentioned fuel channels.

Between the fuel body (or insert) and the wall for the bore, there results thereby a gap which is due to the production tolerances. This gap must be large enough that the block graphite does not shrink onto the fuel body as a result of the variable thermal behavior of fuel bodies and block graphite or as a result of the variable change of dimension in the reactor operation. In the case of fuel charges (or compacts) known at present, whose creep behavior is poor, damage to the structural graphite would occur as a result of the pressure occurring.

However, the decisive problem of removal of heat developed in the fuel particles is closely tied to the gap. The conveyance of heat takes place from the particles through the matrix of the fuel rods via the gap to the block of graphite and through the block of graphite to the cooling channels. The three determining positions therefore are the matrix, gap and block of graphite, of which the gap has the most influence. The temperature difference being built up is given by the temperature of the cooling gas, which is determining for the degree of effectiveness of the installation, and by the temperature of the fuel from which the useful life of the particles or the liberation of the fission product depends. As a result of a slight heat conductivity and a large gap therefore, the degree of effectiveness, the useful life of the particles and the liberation of the fission product is greatly impaired.

All fuel charges (or compacts) known at this time have poor thermal conductivity as compared to block graphite, and they need a relatively large gap for trapping the change in dimension during irradiation, which gap remains intact during practically the whole radiation time.

Figure 1:
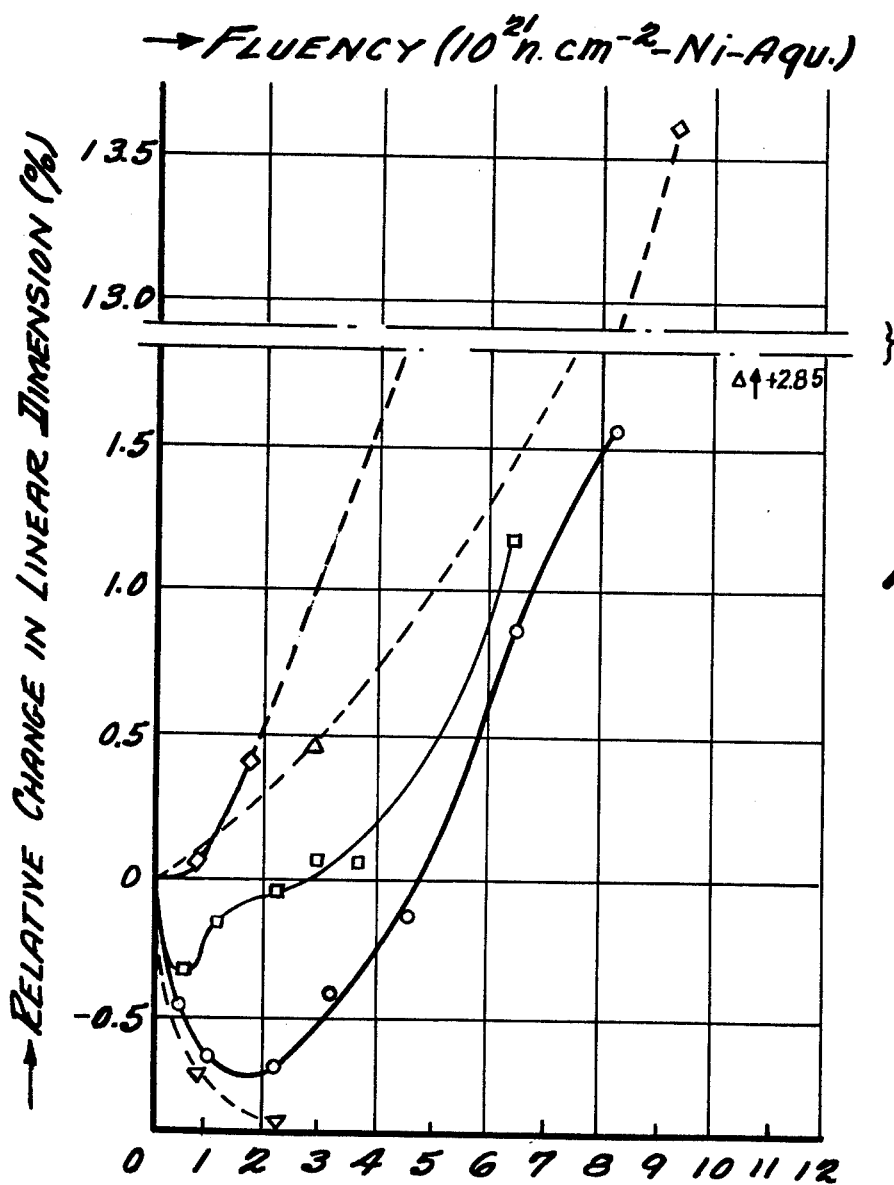
FIG. 1 is a graph showing irradiation behavior of reactor graphites.

In the case of the fuel element for high temperature reactors with good heat transfer from the fuel charge to the structural graphite, the fuel charges (or compacts) according to the invention rest without gap in the bores of the structural graphite. According to the present invention this is achieved by the cylindrical fuel charges (or compacts) being produced from coated particles and a graphite molding powder by pressing and then inserting these green pressed articles (or compacts) into the bores of the block of graphite. Pressing can be accomplished at 10 to 100 kg/cm². During the subsequent carbonization and the following heat treatment, these charges swell and adapt themselves tightly and without gap to the bores. Furthermore, an essential characteristic of the present invention consists in the fact that the composition of the molding powder is selected in such a way that the matrix produced from it has as good heat conductivity as the block or structural graphite, and that during the reactor operation no gap forms between the charge and the block graphite. The latter is achieved by this matrix swelling or shrinking less than the structural graphite from the beginning of radiation and in this manner at no time does development of a gap occur during reactor operation (see the attached FIG. 1 from the report "Concerning the Irradiation Behavior of Reactor Graphites of Various Compositions" by W. Delle, Jul-747-RW, April 1971). A build up of pressure leading to damage is avoided by this matrix having outstanding creep characteristics.

The graphite molding powders being used at the present time consist solely of electrographite (for example graphitxized petroleum coke) or a mixture of natural graphite with the addition of binder materials or natural graphite alone but with high portions of binder, i.e., approximately 50% and more binders.

Figure 2:
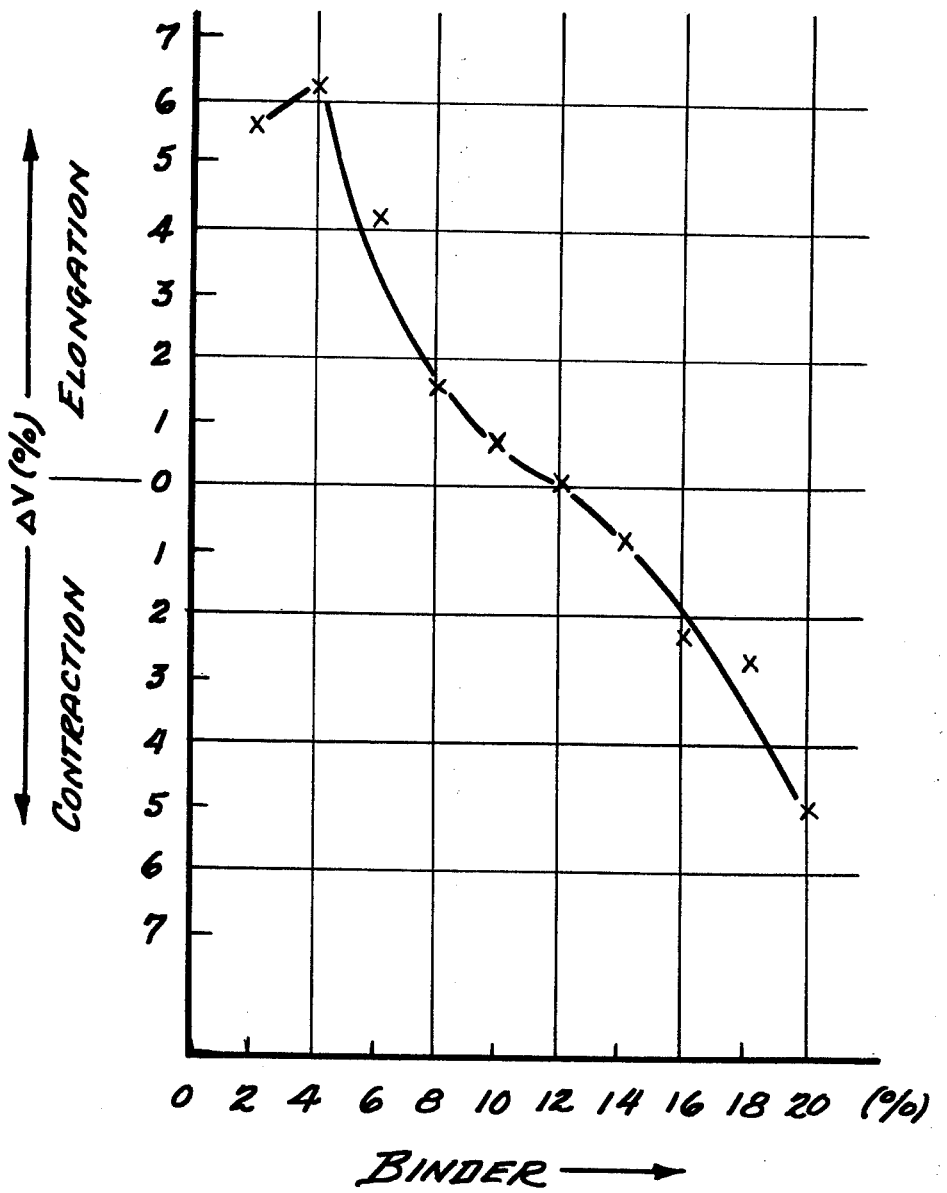
FIG. 2 is a graph showing the contraction/elongation effect as a function of binder content.

As compared to such materials the matrix on which the invention is based consists of natural graphite alone or with only small portions of binders of maximum of 15%, preferably however with < 10%. This composition results from the dependence of the expansion or shrinkage on the binder content during carbonization, as shown in the diagram in FIG. 2. It can be recognized in the case of about 12% binder that the expansion passes over to a shrinkage, so that for a jointless fit of the fuel charges into the bores of the block, a binder content of about 10% is fully sufficient. The creep characteristics become more favorable with a decreasing binder content. The binder in FIG. 2 is coal tar pitch. Other suitable binders include phenol-formaldehyde resins, phenolcresol-formaldehyde resins furfuryl alcohol resin, saccharides. Desirably the binder is easily graphitizable.

EXAMPLE

For the filling of a prismatic fuel element with fuel charges having a heavy metal density specific gravity of about 0.8 g/cc, the coated particles, in the present case oxide kernels having a diameter of 350 – 420 $\mu$ and a thickness of the total layer of about 150 $\mu$, are covered in a known manner with a molding powder. The molding powder consists of a mixture of natural graphite and in the present case 10% coal tar pitch as binder. The covered particles are molded at 20 kg/cm² and at a temperature of 150° C. to cylindrical bodies. When selecting suitable molding conditions, heavy metal specific gravities of 0.8 g/cc and more, e.g. up to 1.2 g/cc can be achieved without difficulty. These fuel bodies are inserted in the bores of the block. Subsequently the filed block is heated in a known manner for carbonizing of the charges and heat-treated to a maximum of 1800° C. The fuel cylinders then are seated without gaps in the bores.

The possibility of carbonizing the fuel charges (or compacts) by themselves and of heat-treating them and using then in the block only after that is an important factor for efficiency in production. This method can be realized easily if the matrix consists of natural graphite with less than 5% binder. In this case the charges (or compacts) can be inserted fittingly into the bores. In certain cases the compacts can be provided additionally with a thin covering free of fuel. According to the present invention, the fuel charge then sits firmly in the bores without gap whenever the fuel element in the reactor arrives at the temperature, since the matrix has been chosen in such a way that it has a larger thermal expansion than the structural graphite. All stresses in this natural graphite matrix are quickly broken down by creeping, so that they never are critical.

In the working example there was used Uranium oxide as kernel material. In place thereof there can be used other nuclear fuels such as thorium oxide, plutonium oxide or mixtures thereof. The coating on the particles in the example was pyrolytic carbon. Other suitable coatings are pyrolytic carbon with silicon carbide, zirconium carbide, niobium carbide. The condition of molding (temperature and pressure) can be those conventionally employed in the art, e.g. 10 to 100 kg/cm$^2$ and 70° to 150° C. The carbonizing can be done by heating up to maximum temperature of 800° to 1100° C. The succeeding heat treatment can be done by heating it in vacuum to a maximum temperature of 1500°–2000° C, preferentially of 1800° C.

The structural graphite in the example was a commercial petroleum coke graphite of nuclear purity (reflector grade). Other suitable structural graphites include pitch coke graphites, gilsonite coke graphites and graphites of other purity grades.

As indicated previously the graphite matrix preferably consists of natural graphite with not over 15% of binder. Binder contents up to 25% can be used if the matrix contains up to 25% electrographite powder.

This difference of the binder content is a consequence of the different behaviour between natural and electrographite powder during carbonization of the matrix. The electrographite powder can be graphitized petroleum coke powder, graphitized needle coke powder, or a powder milled of graphite blocks or rods.

Unless otherwise indicated all parts and percentages are by weight.

We claim:

1. A finished fuel element for high temperature reactors consisting of a block of structural graphite having bores therein filled with molded fuel compacts consisting of coated fuel particles embedded in the graphite matrix, said fuel element having good heat transfer compared to block graphite from the fuel compact and graphite matrix to the structural graphite, wherein the graphite molding powder for fabrication of the graphite matrix consists of a member of the group consisting of (1) natural graphite and up to 15% binder by weight and (2) a mixture of graphite powders consisting of natural graphite, electrographite being present and in an amount of not over 25% by weight and binder being present up to 25% by weight, and wherein relative to their initial ratio of sizes the ratio of the size of the graphite matrix to structural graphite increases with increasing irradiation, the fuel compacts being seated in the bores of the structural graphite without gap, and whereby due to the change in ratio of the size of the graphite matrix to structural graphite with increasing irradiation there is no gap in the bores when the reactor is in operation.

2. A finished fuel element according to claim 1 wherein the graphite matrix swells more during irradiation than the structural graphite.

3. A fuel element according to claim 2 wherein the binder is (1) and is present in an amount of 2 to 15% by weight.

4. A fuel element according to claim 2 wherein the binder is (2) and is present in an amount of 2 to 25% by weight.

5. A process comprising filling the bores of a prismatic graphite block with the molded fuel compacts of claim 2 wherein the compacts are fabricated from a graphite molding powder consisting of natural graphite and binder, the binder being not over 15%, and wherein the molded compacts are heat treated to a maximum temperature of the heat treatment ranging between 1500 and 2000° C and these treated compacts are exactly filled into the bores of the graphite block, said filled graphite block being inserted into the high temperature reactor without further heat treatment before insertion whereby there is no space between the fuel compact and the graphite of the block.

6. A process according to claim 5 wherein the amount of binder is less than 5%.

7. A finished fuel element according to claim 1 wherein the graphite matrix shrinks less during irradiation than the structural graphite.

8. A fuel element according to claim 7 wherein the graphite molding powder for fabrication of the fuel charge consists of natural graphite.

9. A fuel element according to claim 7 wherein an easily graphitizable binder is present.

10. A fuel element according to claim 9 wherein the binder is coal tar pitch present in an amount of 2 to 12%.

11. A fuel element according to claim 7 wherein the binder is (1) and is present in an amount of 2 to 15% by weight.

12. A fuel element according to claim 11 wherein the amount of binder is 2 to 10% by weight.

13. A fuel element according to claim 11 wherein the binder is selected from the group consisting of coal tar pitch, phenol-formaldehyde resin, phenol-cresol-formaldehyde resin, furfuryl alcohol resin and a saccharide.

14. A process comprising filling the bores of a prismatic graphite block with the molded fuel charges of claim 8 and then after heating the block to a carbonization temperature of 800° to 1100° C and to a vacuum treatment temperature of 1500°–2000° C the charges are fitted without gap in the bores of the block.

15. A process according to claim 14 wherein the fuel compacts are made of particles which are coated particles.

16. A fuel element according to claim 7 wherein the binder is (2) and is present in an amount of 2 to 25% by weight.

17. A process comprising filling the bores of a prismatic graphite block with the molded fuel compacts of claim 7 wherein the compacts are fabricated from a graphite molding powder consisting of natural graphite and binder, the binder being not over 15%, and wherein the molded compacts are heat treated to a maximum temperature of the heat treatment ranging between 1500 and 2000° C and these treated compacts are exactly filled into the bores of the graphite block, said filled graphite block being inserted into the high temperature reactor without further heat treatment before insertion whereby there is no space between the fuel compact and the graphite of the block.

18. A process according to claim 17 wherein the amount of binder is less than 5%.

19. A process according to claim 18 wherein the maximum temperature of the heat treatment is 1800° C.

20. A process according to claim 18 comprising providing the fuel compacts with a thin shell of matrix free of fuel particles.

21. A process according to claim 18 wherein the amount of binder is 2 to 5% by weight.

22. A fuel element according to claim 14 and wherein the graphite molding powder for the fabrication of the fuel charge consists of natural graphite.

23. A fuel according to claim 2 wherein an easily graphitizable binder is present.

24. A fuel element according to claim 2 wherein the binder is coal tar pitch present in an amount of 2 to 12%.

25. A process comprising filling the bores of a prismatic graphite block with the molded fuel charges of claim 24 and then after heating the block to a carbonization temperature of 800° to 1100° C and to a vacuum treatment temperature of 1500°–2000° C the charges are fitted without gap in the bores of the block.

26. A process according to claim 25 wherein the fuel compacts are made of particles are coated particles which.

27. A process according to claim 6 wherein the maximum temperature of the heat treatment is 1800° C.

28. A process according to claim 6 comprising providing the fuel compacts with a thin shell of matrix free of fuel particles.

29. A process according to claim 6 wherein the amount of binder is 2 to 5% by weight.

30. A fuel element according to claim 3 wherein the amount of binder is 2 to 10% by weight.

31. A fuel element according to claim 10 wherein the binder is selected from the group consisting of coal tar pitch, phenol-formaldehyde resin, phenol-cresol-formaldehyde resin, furfuryl alcohol resin and a saccharide.

* * * * *